United States Patent [19]

Miyake et al.

[11] Patent Number: 6,096,236
[45] Date of Patent: *Aug. 1, 2000

[54] ANTIFREEZE/COOLANT COMPOSITION

[75] Inventors: Yuji Miyake; Yasuaki Mori, both of Gifu-Ken, Japan

[73] Assignee: CCI Co., Ltd., Seki, Japan

[*] Notice: This patent issued on a continued prosecution application filed under 37 CFR 1.53(d), and is subject to the twenty year patent term provisions of 35 U.S.C. 154(a)(2).

[21] Appl. No.: 09/037,457

[22] Filed: Mar. 10, 1998

[30] Foreign Application Priority Data

Mar. 11, 1997 [JP] Japan ..................................... 9-056122

[51] Int. Cl.$^7$ ............................. C09K 5/20; C09K 5/00
[52] U.S. Cl. ................................................. 252/79; 252/76
[58] Field of Search ......................................... 252/76, 79

[56] References Cited

U.S. PATENT DOCUMENTS

| | | | |
|---|---|---|---|
| 4,647,392 | 3/1987 | Darden et al. | 252/75 |
| 4,851,145 | 7/1989 | Van Neste et al. | 252/75 |
| 5,489,391 | 2/1996 | Nawa et al. | 252/75 |
| 5,811,025 | 9/1998 | Kawai et al. | 252/70 |

FOREIGN PATENT DOCUMENTS 8-269751  10/1996  Japan .

*Primary Examiner*—Christine Skane
*Attorney, Agent, or Firm*—James P. Hanrath

[57] ABSTRACT

An antifreeze/coolant composition is disclosed, which can effectively inhibit corrosion of metals, particularly cast aluminum and cast iron, and can also inhibit cavitation damage to metals in an engine cooling system. The antifreeze/coolant composition comprises a glycol as the chief ingredient, 0.1–0.5% by weight of at least one ingredient selected from among hexanoic acid heptanoic acid and their salts, and 0.1–0.5% by weight of at least one ingredient selected from among alkylbenzoic acids having $C_1$–$C_5$ alkyl and their salts.

5 Claims, 1 Drawing Sheet

2

ANTIFREEZE/COOLANT COMPOSITION

BACKGROUND OF THE INVENTION

1. Technical Field

This invention generally relates to an antifreeze/coolant composition. More particularly, this invention relates to an antifreeze/coolant composition which excels in corrosion inhibition of metals used in a cooling system for an engine, particularly cast aluminnum and cast iron as well as in inhibiting "cavitation" damage.

2. Background Art

A cooling system for an internal-combustion engine generally uses various metals such as aluminum cast aluminum cast iron steel, brass, solder and copper, which are subject to corrosion over time by water or moist air. In order to inhibit metal corrosion, a metal corrosion inhibtion solution such as an antifreeze/coolant composition containing a metal corrosion inhibitor is generally blended in the cooling liquid or water in the cooling system.

An antifreeze/coolant composition as well as cooling water inherently contains some air dissoved therein, which will generate air bubbles or cavitation within the cooling system due chiefly to local fluidic pressure difference and/or vibrations generated through the cooling system. Metal portions, particularly iron parts, of the cooling system can be damaged or corroded by the bubbles, which is called "cavitation damage".

Conventionally, nitrite is blended in antifreeze/coolant compositions to inhibit generation of cavitation. It is assumed that nitrite blended in the antifreeze/coolant compositions provides a protection cover over the metal parts.

Nitrite however is known to produce nitrosoamine a carcinogenic substance, by chemical reaction with amine salts in the cooling liquid. Although use of nitrite in antifreeze/coolant compositions has given rise to controversy, no other effective and safe substitute to inhibit cavitation existed.

Accordingly, it is an object of the present invention to provide an antifreeze/coolant composition which effectively and safely inhibits both corrosion of metals, particularly cast aluinnum and cast iron, and generation of cavitation in a cooling system.

SUMMARY OF THE INVENTION

The antifreeze/coolant composition of the present invention comprises a glycol as the chief ingredient, about 0.1–5.0% by weight of at least one ingredient selected from the group consisting of hexanoic acid, heptanoic acid and their salts, and about 0.1–5.0% by weight of at least one ingredient selected from the group consisting of alkylbenzoic acids having $C_1$–$C_5$ alkyl and their salts.

The antifreeze/coolant composition of the present invention may further comprise about 0.5–1.0% by weight of at least one triazole. Optionally, the antifreeze/coolant composition of the present invention may be characterized in that no operative amount of amine salts or borates are included.

DETAILED DESCRIPTION OF THE PREFERRED EMBODIMENT

Figure 1:
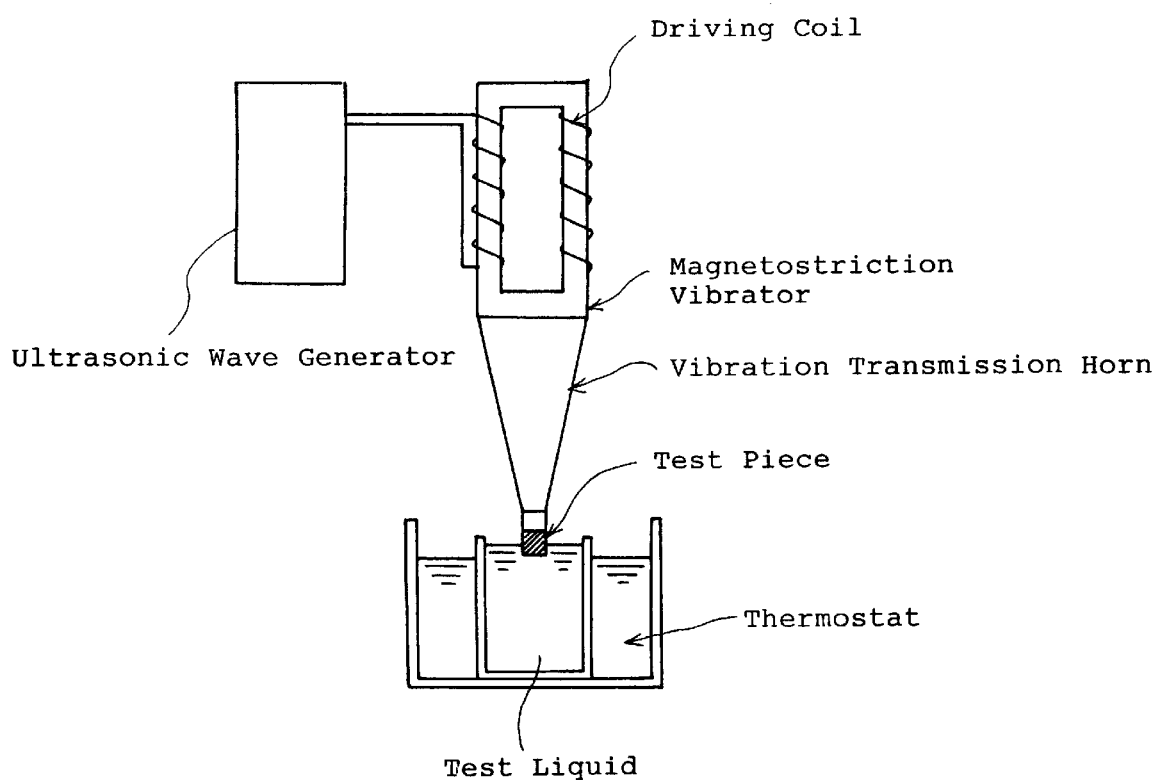
FIG. 1 schematically shows an apparatus for studying the cavitation inhibitory property of compositions.

The antifreeze/coolant composition of the present invention comprises a glycol as the man ingredient, such as ethylene glycol, propylene glycol, 1,3 butylene glycol, hexylene glycol, diethylene glycol or glycerin, among which ethylene glycol and propylene glycol are preferred for their chemical stability and low cost.

The composition further comprises at least one ingredient selected from among hexanoic acid, heptanoic acid and their salts and at least one ingredient selected from among alkylbenzoic acids having $C_1$–$C_5$ alkyl and their salts.

Here, hexanoic acid, heptanoic acid and their salts individually have an excellent aluminum and iron corrosion inhibitory property, and in cooperation with at least one ingredient selected from the group of alkylbenzoic acids having $C_1$–$C_5$ alkyl and their salts can excellently inhibit cavitation in a cooling system.

The salts of hexanoic acid and heptanoic acid may be their alkali metal salts, ammonium salts or amine salts, among which alkali metal salts are preferred. Preferred alkali metal salts are sodium salts and potassium salts. A plurality of these chemicals may be blended in the antifreeze/coolant composition of the present inventions.

Such hexanoic acid, heptanoic acid and/or their salt or salts are blended in the antifreeze/coolant composition of the present invention in a total amount of about 0.1–5.0% by weight. Less than that range will prove insufficient in prohibition of metal corrosion and cavitation while more than that range will merely be uneconomical.

Such alhylbenzoic acids having $C_1$–$C_5$ alkyl and their salts can individually inhibit metal corrosion, particularly aluminun and iron corrosion, as well as inhibit cavitation in a cooling system in cooperation with hexanoic acid, heptanoic acid and/or their salt or salts. In addition, they can individually inhibit precipitation with hard water minerals in the cooling liquid.

The allylbenzoic acids having $C_1$–$C_5$ alkyl may be p-toluic acid, p-ethylbenzoic acid, ppropylbenzoic acid, pisopropylbenzoic acid, p-butylbenzoic acid or p-tert butylbenzoic acid. The salts of alkylbenzoic acids having $C_1$–$C_5$ alkyl may be their alkali metal salts, ammoniumn salts or amine salts, among which akali metal salts such as sodium salts and potassium salts are preferred Such salts may be blended in a plurality.

The alkylbenzoic acids having $C_1$–$C_5$ alkyl and/or their salts may be blended singly or in a plurality in the antifreeze/coolant composition of the present invention in a total amount of about 0.1–5.0% by weight. Less than that range will be inefficient in inhibition of metal corrosion and cavitation and over that range will only be uneconomical.

A triazole or triazoles may be additionally blended, which effectively inhibit corrosion of metals, particularly copper and aluminum in a cooling system Such triazoles nay be benzotriazol, tolyltriazol 4-phenyl-1,2,3-triazole, 2naphthotriazol or 4-nitrobenzotriazol.

The triazole or triazoles may be blended in an amount of about 0.05–1.0% by weight. Less than that range will be insufficient in inhibition of metal corrosion and mare than that range will only be uneconormical.

The antifreeze/coolant composition of the present invention may optionally be characterized by the absence of certain ingredients, namely amine salts or borates. Generation of nitrosoamine in the cooling liquid will be prevented by the absence of amine salts, while the absence of borates will contribute to lessen corrosion of aluminum and aluminum alloys.

The antifreeze/coolant composition of the present invention may optionally and selectively comprise an antifoan and/or colorant, and/or a conventional metal corrosion inhibitor or inhibitors such as molybdate, tungstate, sulfate, nitrate, mercaptobenzothiazol, or their alkali metal salts.

Cavitation damage tests were conducted on Ettnments 1 and 2 and Comparisons 1–4 to study various antifreeze/coolant compositions in comparison using a magnetostriction vibrator schematically shown in FIG. 1. The compositions of Embodiments 1 and 2 were prepared according to the present invention and the compositions of Comparisons 1 to 4 were conventional compositions. Their respective ingredients are given in Table 1.

TABLE 1

| Ingredient | Emb. 1 | Emb. 2 | Com. 1 | Com. 2 | Com. 3 | Com. 4 |
| --- | --- | --- | --- | --- | --- | --- |
| Hexanoic Acid | 3.00 | — | — | — | — | — |
| Heptanoic Acid | — | 3.00 | — | — | 3.00 | — |
| Octanoic Acid | — | — | 3.00 | — | — | — |
| Nonanoic Acid | — | — | — | 3.00 | — | — |
| P-Toluic Acid | 1.00 | 1.00 | 1.00 | 1.00 | — | 1.00 |
| Tolyltriazol | 0.30 | 0.30 | 0.30 | 0.30 | 0.30 | 0.30 |
| Potassium Hydroxide | 1.89 | 1.73 | 1.60 | 1.50 | 1.32 | 0.44 |
| Ethylene Glycol | 91.89 | 91.97 | 92.10 | 92.20 | 93.38 | 92.26 |
| Water | 2.00 | 2.00 | 2.00 | 2.00 | 2.00 | 2.00 |

("Emb." stands for Embodiment, and "Com." stands for Comparison)

The test conditions are given in Table 2.

TABLE 2

| Item | Condition |
| --- | --- |
| Frequency | 19 KHz |
| Amplitude | 30 micro m |
| Test Pieces | FC200 (cast iron) |
| Shape/Size | Circular Disk/16 mm D |
| Weight | About 14 g |
| Concentration | 20% JIS Water Dilution |
| Amount | 50 ml |
| Temperature | 50° C. |
| Depth | 4 mm |

The test results are given in Table 3.

TABLE 3

| | Emb. 1 | Emb. 2 | Com. 1 | Com. 2 | Com. 3 | Com. 4 |
| --- | --- | --- | --- | --- | --- | --- |
| Weight Reduction (mg) | 41.60 | 44.00 | 81.50 | 192.70 | 122.20 | 232.30 |

As Table 3 clearly shows the weight reductions of Embodiments 1 and 2 were far smaller than those of Comparisons 1–4, showing that the compositions according to Embodiments 1 and 2 of the present invention are superior in cavitation inhibition to the conventional positions according to Comparisons 1–4.

What is claimed is:

1. An antifreeze/coolant composition consisting essentially of a glycol as the main ingredient, about 0.1–5.0% by weight of at least one ingredient selected from the group consisting of hexanoic acid, heptanoic acid and their salts, and about 0.1–5.0% by weight of at least one ingredient selected from the group consisting of alkylbenzoic acids having $C_1$–$C_5$ alkyl and their salts.

2. An antifreeze/coolant composition of claim 1, further including about 0.05–1.0% by weight of at least one triazole.

3. An antifreeze/coolant composition of claim 1 in the absence of an operative amount of amine salts or borates.

4. An antifreeze/coolant composition of claim 1 wherein said alkylbenzoic acid is p-toluic acid, p-ethylbenzoic acid, p-propylbenzoic acid, p-isopropylbenzoic acid, p-butylbenzoic acid or p-tert butylbenzoic acid.

5. An antifreeze/coolant composition of claim 2 wherein said triazole is benzotriazole, tolyltriazole, 4-phenyl-1,2,3-triazole, 2-naphthotriazole, or 4-nitrobenzotriazole.

* * * * *